United States Patent [19]
Laue

[11] Patent Number: 5,308,185
[45] Date of Patent: May 3, 1994

[54] METHOD AND MEANS OF FASTENING TWO PARTS WITH AN INTERNALLY THREADED FOLDED FASTENER

[76] Inventor: Charles E. Laue, 1041 Pawnee Rd., Wilmette, Ill. 60091

[21] Appl. No.: 992,085

[22] Filed: Dec. 17, 1992

[51] Int. Cl.⁵ .............................. F16B 7/18; F16B 7/00
[52] U.S. Cl. .................................... 403/342; 403/212
[58] Field of Search ............... 403/342, 343, 285, 278, 403/274, 212, 43, 48, 79

[56] References Cited

U.S. PATENT DOCUMENTS

| | | | |
|---|---|---|---|
| 2,024,880 | 12/1935 | Rydquist | 403/274 |
| 2,480,958 | 9/1949 | Pietzsch | 403/79 |
| 3,590,464 | 7/1971 | Wildi | 403/43 |
| 3,652,111 | 3/1972 | Dent | 403/343 |
| 4,097,163 | 6/1978 | Dubuque | 403/274 |
| 4,901,426 | 2/1990 | Laue | 29/517 |

*Primary Examiner*—P. Austin Bradley
*Assistant Examiner*—Rex E. Pelto
*Attorney, Agent, or Firm*—Hill, Steadman & Simpson

[57] ABSTRACT

Two mechanical components are interconnected, for example, the two principal parts of a pedal rod by forming the clevis with a progressive die so that threaded portions are provided on opposite sides of an opening and are formed and shaped strictly by compression without rotation. The work piece is then folded so that the threaded portions are in register and the shaft part of the pedal rod is threaded in place and adjusted to take up the tolerances in the linkage. The two parts are locked together either by crimping, spot welding or by a lock nut, or by joining out of sync thread segments.

12 Claims, 3 Drawing Sheets

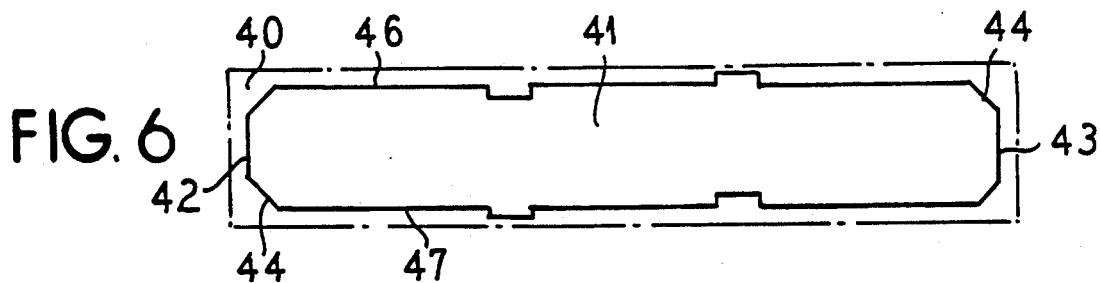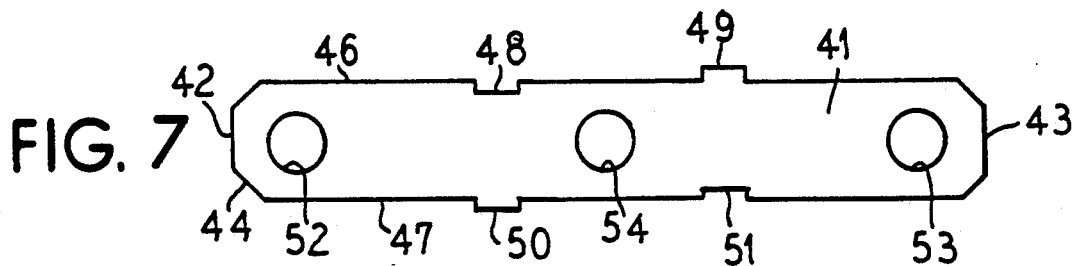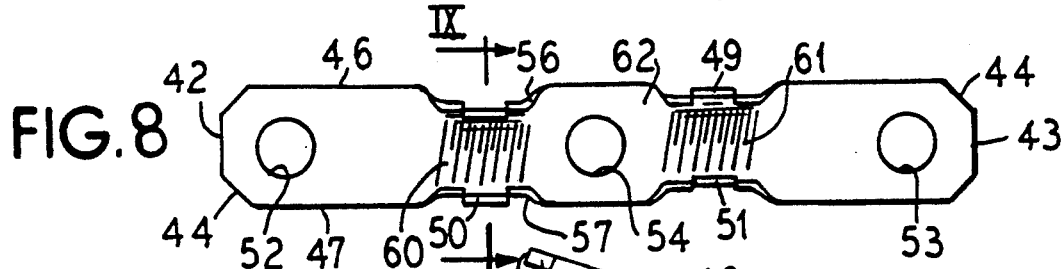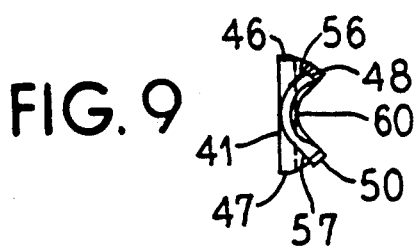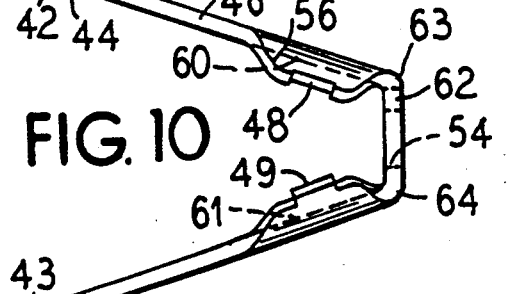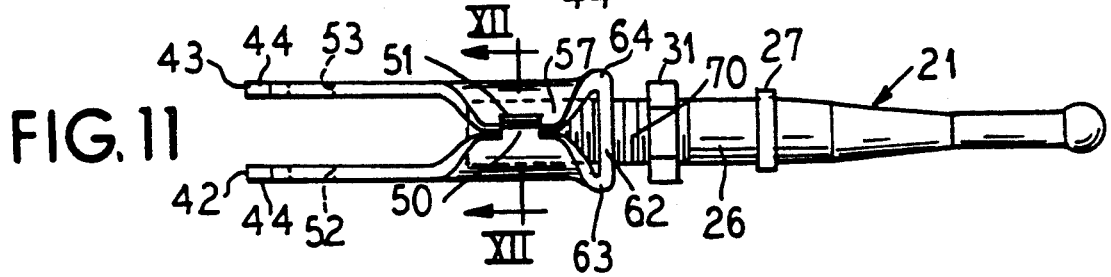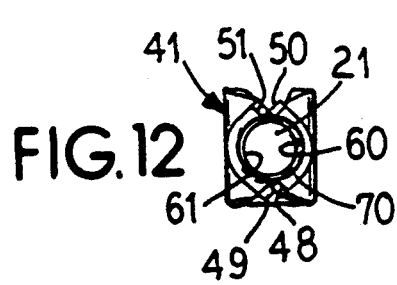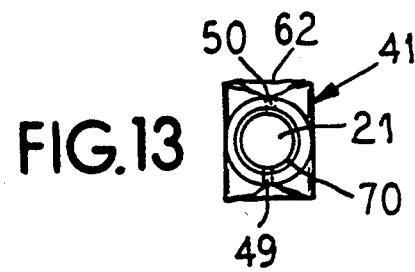

METHOD AND MEANS OF FASTENING TWO PARTS WITH AN INTERNALLY THREADED FOLDED FASTENER

BACKGROUND OF THE INVENTION

1. Field of the Invention

This invention relates generally to method and means of fastening and more specifically to a method and means of interconnecting the two components of an automotive pedal rod.

2. The Prior Art

In my prior application I disclosed a method of forming threads without rotation and interconnecting parts wherein the threaded portions were located on the outside surfaces. Reference is made to that application Ser. No. 07/712,554 now U.S. Pat. No. 5,228,818 filed Jun. 10, 1991 and the prior art cited therein for the establishment of the state of the prior art.

SUMMARY OF THE INVENTION

The present invention exploits the cost saving techniques of automated production in order to produce an assembly that exhibits precise tolerances and great accuracy.

First of all, a strip form material is blanked out on a progressive die to form a generally elongated rectangular blank or work piece having three apertures disposed at opposite ends and at an intermediate position. The ends are trimmed to eliminate sharp corners.

The progressive die also forms a threaded part by compression, and without rotation in two longitudinally spaced locations on opposite sides of the centermost hole or opening, whereupon the blanked out part is folded back upon itself so that opposite leg parts are in alignment with one another. Lugs or ears provided on the blank can be alternated on the respective legs.

If the article in question is a pedal rod, as is disclosed by way of exemplification of the inventive principles in the present application, the folded part can be either a clevis with the two end openings in register with one another or the folded together legs can form a simple metal arm or rod which is appropriately apertured.

In the case of a pedal rod, the second part of the assembly is a shaft part or element which has an externally threaded portion formed at one end which is sized and adapted to be inserted into the clevis and threadedly engaged with the internally threaded portion of the folded part. By simple threaded adjustment, the two parts can be specifically adjusted to pick up all of the tolerances in the linkage, a range which in the average pedal rod assembly will be within approximately seventy (70) thousandths of an inch.

When the final adjustment is achieved, the lugs or ears are then turned down into the adjoining recesses provided in the folded part and the two parts are crimped together or spot welded in firm assembly with one another.

Alternatively, the last step just described can be performed by having the pedal rod formed with a generally rectangular configuration as is disclosed in my earlier acknowledged prior application and the edges of the threaded part of the pedal rod can be provided with two, three, four, or five thread portions which are out of sync with threads formed in the folded part, or clevis.

In such an arrangement, the pedal rod is turned into the clevis and with the development of at least 5 to 40 inch pounds of torque, the two elements of the assembly will remain in permanent firm assembly. However, by selectively varying the engagement of a selected number of threads, the inch pounds of torque can be correspondingly varied.

DESCRIPTION OF THE DRAWINGS

FIG. 6 is a somewhat schematic view of an initial step in the manufacturing method of the present invention wherein the blank is formed by a progressive die cutting step.

FIG. 7 is an elevational view of the blank formed by the progressive die in a further stage of the method of the present invention.

FIG. 8 is a view in the same plane as FIG. 7 but at a further stage of the progressive die operations.

FIG. 9 is a fragmentary cross-sectional view taken on line IX—IX of FIG. 8.

FIG. 10 is a side view showing the blank during the course of a folding step of the inventive method.

FIG. 11 is a side elevational view showing the folded blank being adjustably assembled in accordance with the process of the present invention.

FIG. 12 is a fragmentary cross-sectional view taken on line XII—XII of FIG. 11.

FIG. 13 is a view taken on the same plane as FIG. 12 but showing the lugs crimped into locking position in accordance with the process of the present invention.

DESCRIPTION OF THE PREFERRED EMBODIMENTS AND THE PREFERRED METHODOLOGY

While the principles of the present invention are applicable to the joinder of any two parts, the inventive discoveries find a particularly useful application to the manufacture of pedal rods of the type utilized in automotive vehicles. Accordingly, an exemplary disclosure is made herein to show how the principles of the present invention may be applied to pedal rods of different configuration and how a manufacturing process can be utilized which advantageously exploits modern mass production manufacturing techniques utilizing robots and computerized machinery.

A typical environment in which a pedal rod is employed in the automobile industry is established by a so-called 205 Tandem Recessed Series Zero Lost Travel Master VAC shown generally at 20. The device 20 is adapted to be actuated by a pedal rod assembly which appears at the right hand side of FIG. 1 and is shown at 21.

Japanese manufacturers generally utilize pedal rods which are of the so-called clevis type, whereas American car manufacturers have heretofore preferred pedal rods wherein the pedal rod has a simple apertured bar or rod. The principles of the present invention are equally applicable to both types of pedal rods and the references to one or the other is merely intended to be illustrative.

Figure 1:
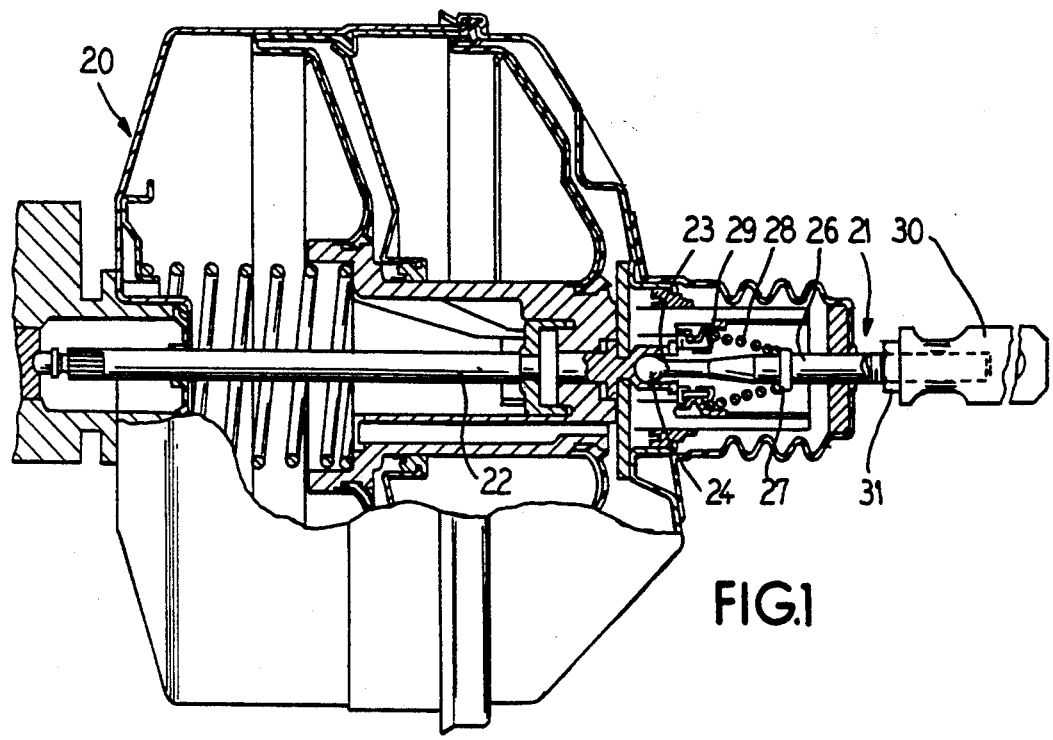
FIG. 1 is an elevational drawing with parts broken away and with parts shown in cross-section of an exemplary environment in which the invention finds a particular utility, to wit, a 205 mm Tandem Recessed Series Zero Lost Travel Master VAC in which a pedal rod is utilized for actuation, it being understood that the pedal rod is of the type embodying and constructed in accordance with method of the present invention.
Figure 2:
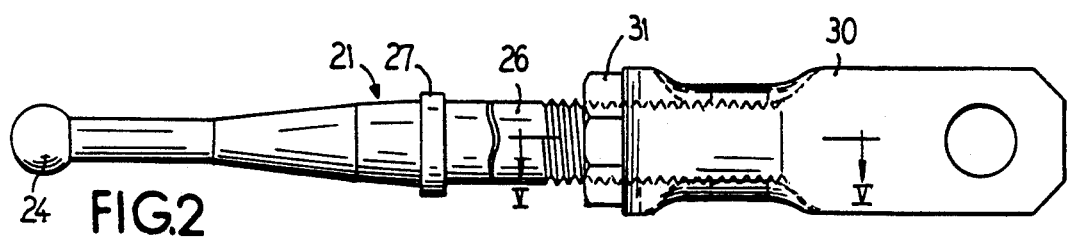
FIG. 2 is an elevational view of a pedal rod constructed in accordance with the principles of the present invention and made by practicing the method of the present invention.
Figure 3:
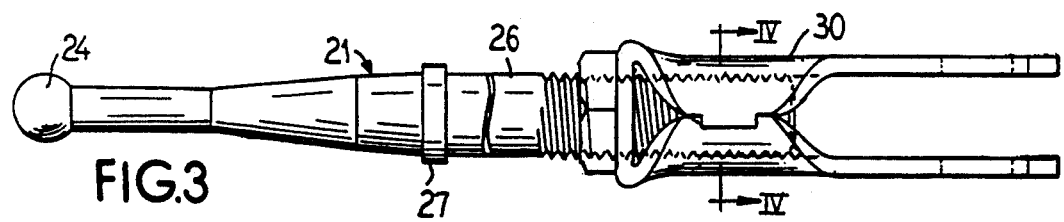
FIG. 3 is a plan elevational view of the pedal rod of FIG. 2.
Figure 4:
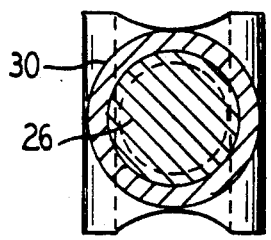
FIG. 4 is a fragmentary cross-sectional view taken on line IV—IV of FIG. 3.
Figure 5:
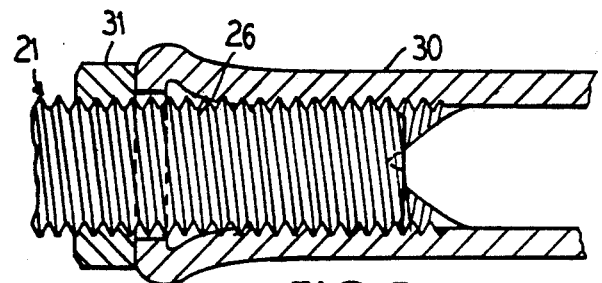
FIG. 5 is a fragmentary cross-sectional view taken on line V—V of FIG. 2.

As shown in FIG. 1, the Master VAC unit 20 has an actuator member 22 which is recessed at 23 in a size and configuration to operatively receive and engage a ball 24 formed on one end of a first component element of the pedal rod 21, namely, the shaft 26. A shoulder 27 is formed on the shaft 26 for holding a spring retainer associated with a spring 28, the opposite end of which is in engagement with parts of the Master VAC assembly referred to generally at 29, the details and operation of which are not necessary to the understanding of the present invention.

The shaft component element 26 of the pedal rod 21 is connected at its opposite end to a second component element of the pedal rod, namely, the clevis 30, or apertured rod, as the case may be. If necessary or desired, a lock nut 31 may be utilized in conjunction with the shaft 26 and the clevis 30.

It is with the formation and construction and connection of the two component element parts 26 and 30 that the present invention is particularly concerned.

Referring to the series of drawing figures identified as FIG. 6 through FIG. 13, the steps of the inventive method will be described. First of all, a supply of raw material can take the form of bar stock stored in rolls and constituting sheet form material of approximately one eighth (⅛) inch in thickness. The material can be fed into a progressive die machine of the type having four or five stations and which is controlled by automated computerized control programs.

At a first station, the raw material is initially trimmed to provide a first rough blank 40 exhibiting an extra dimensional width which may be removed as flashing of approximately one quarter of an inch on each side. A generally elongated rectangular blank 41 forming the actual work piece is then cut from the rough blank 40 at which stage the blank 41 has end walls 42 and 43 which are trimmed or rounded to eliminate sharp corners as at 44. A pair of longitudinally extending side walls are formed with legs as at 46 and 47 in spaced parallel relation to one another. The leg 46 has a notch or recess 48 formed therein and a lug or ear 49 is also formed. The opposite leg 47 has a lug or ear 50 formed therein in alignment with the recess 48 as well as a notch or recess 51, correspondingly in alignment with the lug or ear 49.

The progressive die is also programmed to cut three holes or openings in the blank 41. The first hole or opening is formed inwardly of the end wall 42 and is shown at 52. At the opposite end, and correspondingly inwardly of the end wall 43, there is formed a second hole or opening 53. At approximately the midpoint of the blank 41 there is formed a third hole or opening 54.

In accordance with the present invention, the blank is worked at an appropriate station of the progressive die to form strictly by vertical pressing action and without rotation two longitudinally spaced apart threaded portions between and in alignment with the respective recesses and ears 48–50 and 49–51. Referring to FIG. 8 of the drawings in conjunction with FIG. 9, it will be noted that the leg 46 is bent to form a rounded contour 56 with the recess 48 in the center thereof while the leg 47 is correspondingly bent to form a rounded contour 57 with the ear 50 disposed in the center thereof.

The threaded portions are identified at 60 and 61 and are disposed symmetrically on opposite longitudinal sides of the opening 54, thereby forming a center apertured zone or area 62. At this stage of the manufacturing process, the recesses 48 and 51 and the lugs or ears 49 and 50 will still be in the relative positions depicted in FIG. 9 of the drawings and the formed blank is ready for a folding operation, the initial portions of which are depicted in FIG. 10.

As shown in FIG. 10, the opposite ends of the blank work piece 41 are folded on fold lines 63 and 64 at the opposite sides of the center zone or area 62. The fold lines 63 and 64 are predetermined in location so that at the two legs of the work piece 41 are folded back upon themselves, the threaded portions 60 and 61 will be placed in precise mating alignment with one another and the ear 50 will be aligned with the recess 51 while the ear 49 will be aligned with the recess 48. Further, the apertures 52 and 53 will also be aligned in register with one another.

In the formation of a successful pedal rod, it is essential that the device exhibit the requisite dimensions to be within prescribed tolerance limits as demanded by the automotive manufacturer. Accordingly, in order to pick up the tolerances in the linkage, the shaft part or element 21 is now preliminarily joined with the work piece 41, which is now in the structural configuration of a clevis.

As is customary in the art, the shaft part 21 is formed with external threads as at 70. The dimensions of the shaft part 21 and of the threads 70 are preselected so that the shaft part is received in the opening 54 in the center zone or area 62 of the clevis 41 and threadedly engages the threads 60 and 61, now functionally related as a single threaded opening in the clevis 41.

By simple threaded adjustment, the shaft part 21 can be adjusted longitudinally relative to the clevis 41 to pick up the tolerances in the linkage. It is estimated that the average range of such adjustment may be in the order of about seventy thousandths of an inch (0.070"). While such adjustment is being effected, the parts of the sub-assembly are in the relative positions of FIGS. 11 and 12. Once such adjustment is achieved, the lugs or ears 49 and 50 are turned down into the respective adjoining recesses 48 and 51, whereupon the two component parts 21 and 41 can be crimped into permanent firm assembly with one another in the manner depicted in FIG. 13. Spot welding could also be employed. Hence, the assembly can be secured by either crimping or spot welding, or both. While not essential to the practice of the invention, if deemed necessary or desirable, the lock nut 31 may be turned against the zone or area 62 to further insure the locked together integrity of the two parts.

Figure 14:
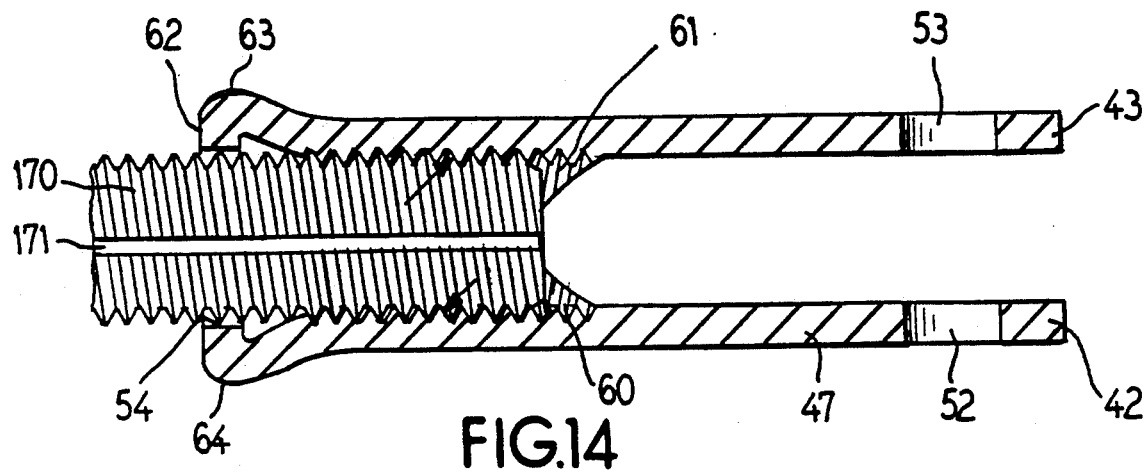
FIG. 14 is an enlarged fragmentary cross-sectional view illustrating the use of out of sync thread segments to selectively vary the torque strength of the joint.

An alternative is contemplated in accordance with the principles of the present invention by utilizing the improvements already described in conjunction with the improvements of my prior acknowledged application. Thus, as shown in FIG. 14, the relative threat segments can be selectively made out of synchronization and in variable combining numbers of joining threads so that the inch pounds of torque necessary to disconnect the joint may be preselected.

The last step of the process described above is varied in practicing this alternative by providing a shaft part 121 having edges formed with thread segments 170. The thread segments 170 can be provided with two, three, four, or five thread portions which are out of sync with the threads in the clevis 41.

By virtue of such provision, the shaft part 121 of the pedal rod assembly can be turned into the clevis part 41 and with the development of at five (5) to forty (40) inch pounds of torque resistance, the two elements of the pedal rod will never come apart.

The inch pounds of resistance torque can be selectively varied by engaging a selected number of thread segments 170 with the threads 60-61 in the clevis 41.

Figure 15:
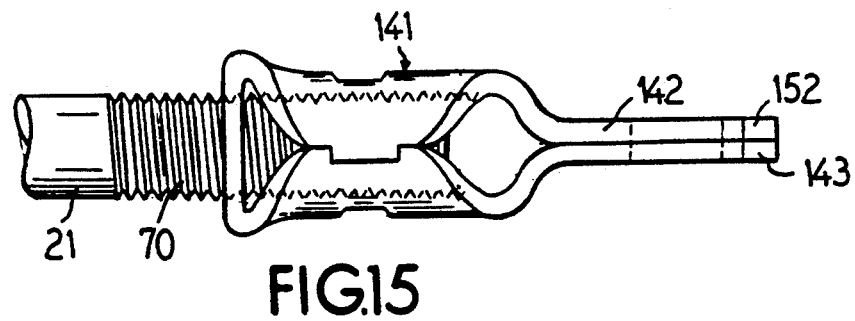
FIG. 15 is a fragmentary view somewhat similar to the plane of FIG. 3 but showing an alternative form of the invention.
Figure 16:
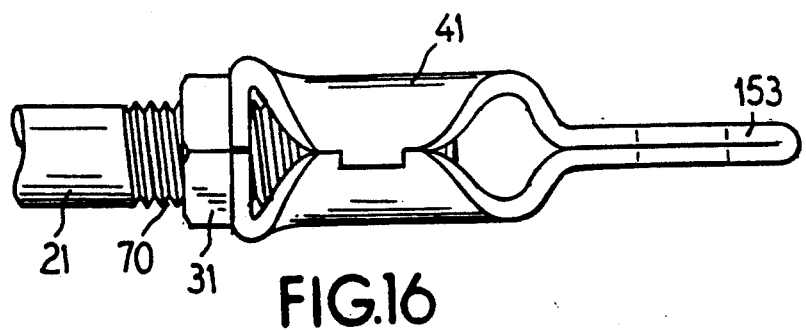
FIG. 16 is a view similar to FIG. 15 but showing yet another form of the invention.

It will be understood that it is contemplated that the clevis could be formed as shown at 141 of two separate parts 142 and 143 as depicted in FIG. 15 or could be formed to provide a single arm or rod configuration instead of a clevis, in which event the work piece would end up in the configuration of either FIG. 15 or FIG. 16 wherein the two piece version or the folded one piece version are shown with apertured arms 152 and 153, respectively.

Although minor modifications might be suggested by those versed in the art, it should be understood that I wish to embody within the scope of the patent warranted hereon all such modifications as reasonably and properly come with the scope of my contribution to the art.

I claim as my invention:

1. In combination, a first part comprising a strip form ductile metal member of
   elongated configuration having spaced apart surfaces with each of said surfaces being means for deformably displacing to form projections extending upwardly from said surfaces and recesses extending into said surfaces thereby to provide thread portions which are press formed without rotation,
   said first part having an opening extending therethrough at a location between said thread portions,
   said first part being folded back upon itself on fold lines extending laterally of said first part on opposite longitudinal sides of said opening,
   said first part being folded so that said threaded portions in said spaced apart surfaces are placed in complemental registration with one another, said spaced apart surfaces being means for cooperating with one another to form a threaded bore inwardly of said opening and,
   a second part comprising an externally threaded cylindrical part sized and shaped to be received in said opening and engaging said first part in threaded engagement with said threaded portions.

2. In the combination of claim 1,
   the further provision of locking means locking said first and second parts in firm assembly with one another.

3. The invention of claim 2 wherein the locking means comprises a lock nut threaded on the second part and engaging the first part.

4. The invention of claim 2 wherein the locking means comprises a crimped joint between the first and second parts.

5. The invention of claim 2 wherein the locking means comprises a selected plurality of thread segments formed on the second member which are out of sync with the threaded portions on the first member, thereby to selectively vary the connection by engaging a selected number of thread segments.

6. A pedal rod comprising,
   a shaft part and a head part being means for connecting together in adjustable relationship to take up the tolerances in a linkage,
   said shaft part comprising a rod-like element having a ball formed at one end,
   said shaft part having a circumferentially extending shoulder formed at an intermediate portion thereof to bottom a spring, and
   an externally threaded shank portion formed at its other end being means for attachment to the head part,
   said head part comprising a sheet form member having first and second legs folded back upon itself to form a flat shoulder at one end through which extends an opening sized to receive said shank of said shaft part, and disposing said legs in parallel relation to one another,
   each of said legs having a threaded portion formed therein by compression without rotation so that the two legs together cooperate to form a threaded bore being means for receiving the shank of the shaft part in threaded assembly,
   whereby the two parts of the pedal rod can be longitudinally adjusted with respect to one another by threaded rotation,
   each of said legs being formed to include alternate recesses and ears so that upon folding of the legs, the ears and recesses may be fitted together to be means for assisting in locking the two parts in final assembly with one another.

7. A pedal rod as defined in claim 6 and further characterized by,
   a crimped joint formed between the two parts after they have been adjusted longitudinally with respect to one another thereby to lock the parts in final assembly.

8. A pedal rod as defined in claim 6 and further characterized by,
   each of said legs extending in spaced parallel relation to one another and having registering openings formed therein to thereby form a clevis for attachment to an automotive device.

9. A pedal rod as defined in claim 6 and further characterized by,
   each of said legs extending in adjacent parallel relation to one another and being apertured to thereby form an arm for attachment to an automotive device.

10. A pedal rod as defined in claim 6 and further characterized by,
    each of said legs being made as a separate independent part and being connected together to form an integral arm for attachment to an automotive vehicle.

11. A pedal rod as defined in claim 6 and further characterized by,
    a spot welded joint formed between the two points after they have been adjusted longitudinally with respect to one another thereby to lock the parts in firm assembly.

12. A pedal rod comprising;

a shaft part and a head part being means for connecting together in adjustable relationship to take up the tolerances in a linkage, said shaft part comprising a rod-like element having a ball formed at one end, an externally threaded shank portion formed at its other end being means for attachment to the head part, said head part comprising a sheet form member having first and second legs folded back upon itself to form a flat shoulder at one end through which extends an opening sized to receive said shank of said shaft part, and disposing said legs in parallel relation to one another to form a clevis part, each of said legs having a threaded portion formed therein by compression without rotation so that the two legs together cooperate to form a threaded bore being means for receiving the shank of the shaft part and threaded assembly, whereby the two parts of the pedal rod can be longitudinally adjusted with respect to one another by threaded rotation, and means for locking the parts in firm assembly with one another.

* * * * *